US012051440B1

(12) United States Patent
Pan et al.

(10) Patent No.: US 12,051,440 B1
(45) Date of Patent: Jul. 30, 2024

(54) SELF-ATTENTION-BASED SPEECH QUALITY MEASURING METHOD AND SYSTEM FOR REAL-TIME AIR TRAFFIC CONTROL

(71) Applicants: CIVIL AVIATION FLIGHT UNIVERSITY OF CHINA, Guanghan (CN); Weijun Pan, Guanghan (CN)

(72) Inventors: Weijun Pan, Guanghan (CN); Yidi Wang, Guanghan (CN); Qinghai Zuo, Guanghan (CN); Xuan Wang, Guanghan (CN); Rundong Wang, Guanghan (CN); Tian Luan, Guanghan (CN); Jian Zhang, Guanghan (CN); Zixuan Wang, Guanghan (CN); Peiyuan Jiang, Guanghan (CN); Qianlan Jiang, Guanghan (CN)

(73) Assignee: Civil Aviation Flight University of China, Guanghan (CN)

( * ) Notice: Subject to any disclaimer, the term of this patent is extended or adjusted under 35 U.S.C. 154(b) by 0 days.

(21) Appl. No.: 18/591,497

(22) Filed: Feb. 29, 2024

(30) Foreign Application Priority Data

Apr. 12, 2023 (CN) ......................... 202310386970.9

(51) Int. Cl.
*G10L 25/60* (2013.01)
*G08G 5/00* (2006.01)
(Continued)

(52) U.S. Cl.
CPC ............ *G10L 25/60* (2013.01); *G08G 5/0095* (2013.01); *G10L 21/0388* (2013.01);
(Continued)

(58) Field of Classification Search
CPC ..... G10L 25/60; G10L 21/0388; G10L 25/18; G10L 25/21; G10L 25/30; G10L 25/93;
(Continued)

(56) References Cited

U.S. PATENT DOCUMENTS

2007/0203694 A1 * 8/2007 Chan ....................... G10L 25/69
704/E19.002
2008/0219471 A1 9/2008 Sugiyama
(Continued)

FOREIGN PATENT DOCUMENTS

CN 106531190 3/2017
CN 111968677 11/2020
(Continued)

OTHER PUBLICATIONS

Notification to Grant Patent Right for Invention from SIPO in 202310386970.9 dated May 24, 2023.
(Continued)

*Primary Examiner* — Fariba Sirjani
(74) *Attorney, Agent, or Firm* — Pilloff Passino & Cosenza LLP; Rachel K. Pilloff; Sean A. Passino

(57) ABSTRACT

Disclosed are a self-attention-based speech quality measuring method and system for real-time air traffic control, including following steps: acquiring real-time air traffic control speech data and generating speech information frames; detecting the speech information frames, discarding unvoiced information frames of the speech information frames, generating a voiced long speech information frame; performing mel spectrogram conversion, attention extraction and feature fusion on the long speech information frame to obtain a predicted mos value.

12 Claims, 8 Drawing Sheets

(51) Int. Cl.

| | |
|---|---|
| ***G10L 21/0388*** | (2013.01) |
| ***G10L 25/18*** | (2013.01) |
| ***G10L 25/21*** | (2013.01) |
| ***G10L 25/30*** | (2013.01) |
| ***G10L 25/93*** | (2013.01) |

(52) U.S. Cl.
CPC .............. *G10L 25/18* (2013.01); *G10L 25/21* (2013.01); *G10L 25/30* (2013.01); *G10L 25/93* (2013.01); *G10L 2025/937* (2013.01)

(58) Field of Classification Search
CPC .......... G10L 2025/937; G10L 704/202; G08G 5/0095
See application file for complete search history.

(56) References Cited

U.S. PATENT DOCUMENTS

| | | | | |
|---|---|---|---|---|
| 2019/0122651 | A1* | 4/2019 | Arik | G10L 13/08 |
| 2020/0286504 | A1* | 9/2020 | Seetharaman | G10L 21/0232 |
| 2021/0233299 | A1* | 7/2021 | Zhou | G06T 13/205 |
| 2022/0415027 | A1* | 12/2022 | Nie | G06V 10/75 |
| 2023/0282201 | A1* | 9/2023 | Bissell | G10L 13/086 704/270 |
| 2023/0317093 | A1* | 10/2023 | Xiao | G10L 21/0232 704/226 |
| 2023/0335114 | A1* | 10/2023 | Bakst | G10L 25/60 |
| 2023/0343319 | A1* | 10/2023 | Hu | G06N 3/0442 |
| 2023/0409882 | A1* | 12/2023 | Ahmed | G06N 3/0455 |
| 2023/0420085 | A1* | 12/2023 | Mukherjee | G06N 3/045 |

FOREIGN PATENT DOCUMENTS

| | | |
|---|---|---|
| CN | 112562724 | 3/2021 |
| CN | 113782036 | 12/2021 |
| CN | 114187921 | 3/2022 |
| CN | 114242044 | 3/2022 |
| CN | 115457980 | 12/2022 |
| CN | 115547299 | 12/2022 |
| CN | 115691472 | 2/2023 |
| CN | 115798518 | 3/2023 |
| CN | 115985341 | 4/2023 |
| JP | 2014228691 | 12/2014 |

OTHER PUBLICATIONS

Office action from SIPO in 202310386970.9 dated May 17, 2023.
Search report from SIPO in 202310386970.9 dated Apr. 24, 2023.
Search report from SIPO in 202310386970.9 dated May 22, 2023.
Yuchen Liu, et al., CCATMos: Convolutional Context-aware Transformer Network for Non-intrusive Speech Quality Assessment, Internet publication arxiv.org/abs/2211.02577 dated Nov. 4, 2022.
Qin Mengmeng, Study on Speech Quality Assessment Based on Deep Learning, "China Excellent Master's Degree Thesis Literature database (information technology series)" 154 Jan. 2022 (Abstract on pp. 11-12).

* cited by examiner

SELF-ATTENTION-BASED SPEECH QUALITY MEASURING METHOD AND SYSTEM FOR REAL-TIME AIR TRAFFIC CONTROL

CROSS-REFERENCE TO RELATED APPLICATIONS

This application claims priority of Chinese Patent Application No. 202310386970.9 filed on Apr. 12, 2023, the entire contents of which are incorporated herein by reference.

TECHNICAL FIELD

The application relates to the technical field of aviation air traffic management, and in particular to a self-attention-based speech quality measuring method and system for real-time air traffic control.

BACKGROUND

The quantitative evaluation of the speech quality for air traffic control has always been one of the difficult problems in the aviation industry, and control speech is the most important way of communication between controllers and crew flights. At present, the main flow for processing control speech is as follows: firstly, the control speech data is obtained by automatic speech recognition (ASR) technology, and then the speech information is extracted from the control speech data and analyzed by Natural Language Processing (NLP). It can be seen that the correctness of speech recognition result is the most important part in the control speech processing, and the quality of the control speech itself is an important factor affecting the correctness of the speech recognition result.

At present, there are two main evaluation methods for speech quality, one is an objective evaluation method based on numerical operation, and the other is a subjective evaluation method based on expert system scoring. The subjective evaluation method is the most typical method in speech quality measurement, and takes Mean Opinion Score (MOS) value as the index of speech quality evaluation. Generally, the recommendations of ITU-TP.800 and P.830 are adopted for the MOS value. Different people compare the subjective feelings of the original corpus and the faded corpus after systematic processing, and get the MOS value. Finally, the average value of MOS value is obtained. The average value is distributed between 0 and 5, with 0 representing the worst quality and 5 representing the best quality.

For subjective speech quality measurement, it has an advantage of intuitive effect, but at the same time, it has the following shortcomings: firstly, because of the characteristics of MOS scoring itself, it takes a long time and costs a lot to evaluate a single speech; then, the scoring system may only be carried out offline, and fails to process streaming control speech in real time; lastly, scoring is very sensitive to the unvoiced part of speech, so it is necessary to remove the unvoiced part of speech for evaluation.

SUMMARY

The application aims at overcoming the problems that the scoring system in the prior art consumes a long time, and fails to process streaming speech in real time and the unvoiced part of speech, and provides a self-attention-based speech quality measuring method and system for real-time air traffic control.

In order to achieve the above objective, the present application provides the following technical scheme.

self-attention-based speech quality measuring method for real-time air traffic control includes:

S1, acquiring real-time air traffic control speech data, time stamping and encapsulating, and then combining with control data for secondary encapsulating to generate speech information frames;

S2, detecting the speech information frames, dividing into an unvoiced information frame queue and a voiced information frame queue and predetermining a time length; when a length of any one queue inserting into the speech information frames exceeds a predetermined time length, dequeueing the speech information frames in the unvoiced information frame queue and the voiced information frame queue at a same time, and discarding dequeued information frames of the unvoiced information frame queue, and detecting dequeued information frames of the voiced information frame queue, and merging information larger than 0.2 second to generate a long speech information frame; and

S3, processing the long speech information frame through a self-attention neural network and obtaining a predicted mos value, where the neural network includes a mel spectrum auditory filtering layer, an adaptive convolutional neural network layer, a transformer attention layer and a self-attention pooling layer.

Optionally, in the S2, the long speech information frame is generated, with a start time of a speech information frame at a head of the voiced information frame queue as a start time and an end time of a speech information frame at a tail of the voiced information frame queue as an end time, the control data is mergeable with the long speech information frame at a self-defined time.

Optionally, the mel spectrum auditory filtering layer converts the long speech information frame into a power spectrum, and then the power spectrum is dot product with mel filter banks to map a power into a mel frequency and linearly distribute the mel frequency. The following formula is used to map:

$$H_m(k) = \begin{cases} 0 & k < f(m-1) \\ \dfrac{k - f(m-1)}{f(m) - f(m-1)} & f(m-1) \le k \le f(m) \\ \dfrac{f(m+1) - k}{f(m+1) - f(m)} & f(m-1) \le k \le f(m) \\ 0 & k > f(m+1) \end{cases},$$

where k represents an input frequency and is used to calculate a frequency corresponding $H_m(k)$ of each of mel filters, m represents a serial number of the filters, f(m−1) and f(m), and f(m+1) respectively correspond to a starting point, an intermediate point and an ending point of an m-th filter, and a mel spectrogram is generated after dot product.

Optionally, converting the long speech information frame into the power spectrum includes differentially enhancing high-frequency components in the long speech information frame to obtain an information frame, segmenting and windowing the information frame, and then converting a processed information frame into the power spectrum by using Fourier transform.

Optionally, the adaptive convolutional neural network layer includes a convolutional layer and an adaptive pool, resamples the mel spectrogram, merges data convolved by convolution kernels in the convolutional layer into a tensor, and then normalizes the tensor into a feature vector.

Optionally, the transformer attention layer applies a multi-head attention model to carry out embedding the feature vector for time sequence processing, and applies learning matrices to convert a processed vector, and applies a calculation formula to calculate an attention weight of a converted vector. The calculation formula is as follows:

$$W_{attention}=\left(\frac{e^{\frac{Q*K^T}{\sqrt{d}}}}{\sum_{i=0}^{n}e^{\frac{Q*K^T}{\sqrt{d}}}}\right)V,$$

where $K^T$ is the transpose of the K matrix, $\sqrt{d}$ is the length of the feature vector and $W_{attention}$ is the weight, and the attention vector $X_{attention}$ is obtained by dot-producting the weight with the feature vector.

Optionally, after the extraction of the attention vector is completed, a multi-head attention vector $Y_{attention}'$ is calculated by using the multi-head attention model, multi-head attention vector $Y_{attention}'$ is normalized by layernorm to obtain $Y_{layernorm}$ and then activated by gelu to obtain the final attention vector $Y_{attention}$. The calculation formula is as follows:

$$Y_{attention}'=\text{concat}[X_{attention}^{1},X_{attention}^{2},\ldots,X_{attention}^{m}]_{1*n}*W_0$$

where concat is a vector connection operation and $W_o$ is a learnable multi-head attention weight matrix;

a gelu activation formula is as follows:

$$Y_{attention}=0.5*Y_{layernorm}*\left(1+\tanh\left(\sqrt{\frac{2}{\pi}}*\left(Y_{layernorm}+0.044715Y_{layernorm}^{3}\right)\right)\right).$$

Optionally, the self-attention pooling layer compresses the length of the attention vector through a feed-forward network, codes and masks the vector part beyond the length, normalizes a coded masked vector, dot-products the coded masked vector with the final attention vector, and a dot-product vector passes through a fully connected layer to obtain a predicted mos value vector.

Optionally, the mos value is linked with the corresponding long speech information frame to generate real-time measurement data.

In order to achieve the above objective, the application also provides the following technical scheme.

A self-attention-based speech quality measuring system for real-time air traffic control includes a processor, a network interface and a memory. The processor, the network interface and the memory are connected with each other. The memory is used for storing a computer program, the computer program includes program instructions, and the processor is configured to call the program instructions to execute the self-attention-based speech quality measuring method for real-time air traffic control.

Compared with the prior art, the application has following beneficial effects.

According to the self-attention-based speech quality measuring method and system for real-time air traffic control provided by the application, through sampling the streaming speech data input in real time at a fixed time and then storing in the form of bits, and then encapsulating the control data and merging into the speech information frame, the problem that the real-time speech data fails to be processed and stored at the same time is solved, and the problem of long-term silence in the real-time speech data is solved through the cooperative processing of the voiced queue and the unvoiced queue, the influence of unvoiced speech on the evaluation is avoided, and the objectivity of speech evaluation is improved. Finally, based on the processing of self-attention neural network and taking mos scoring framework as a model, the real-time control speech data is scored through stimulating expert system, and the machine replaces labor, which solves the problem that speech evaluation takes a long time and may only be carried out off-line, and realizes the real-time scoring of control speech.

DETAILED DESCRIPTION OF THE EMBODIMENTS

In the following, the application will be further described in detail in combination with experimental examples and specific embodiments. However, it should not be understood that the scope of the above-mentioned subject matter of the present application is limited to the following embodiments, and all technologies achieved based on the contents of the present application belong to the scope of the present application.

Embodiment 1

Figure 8:
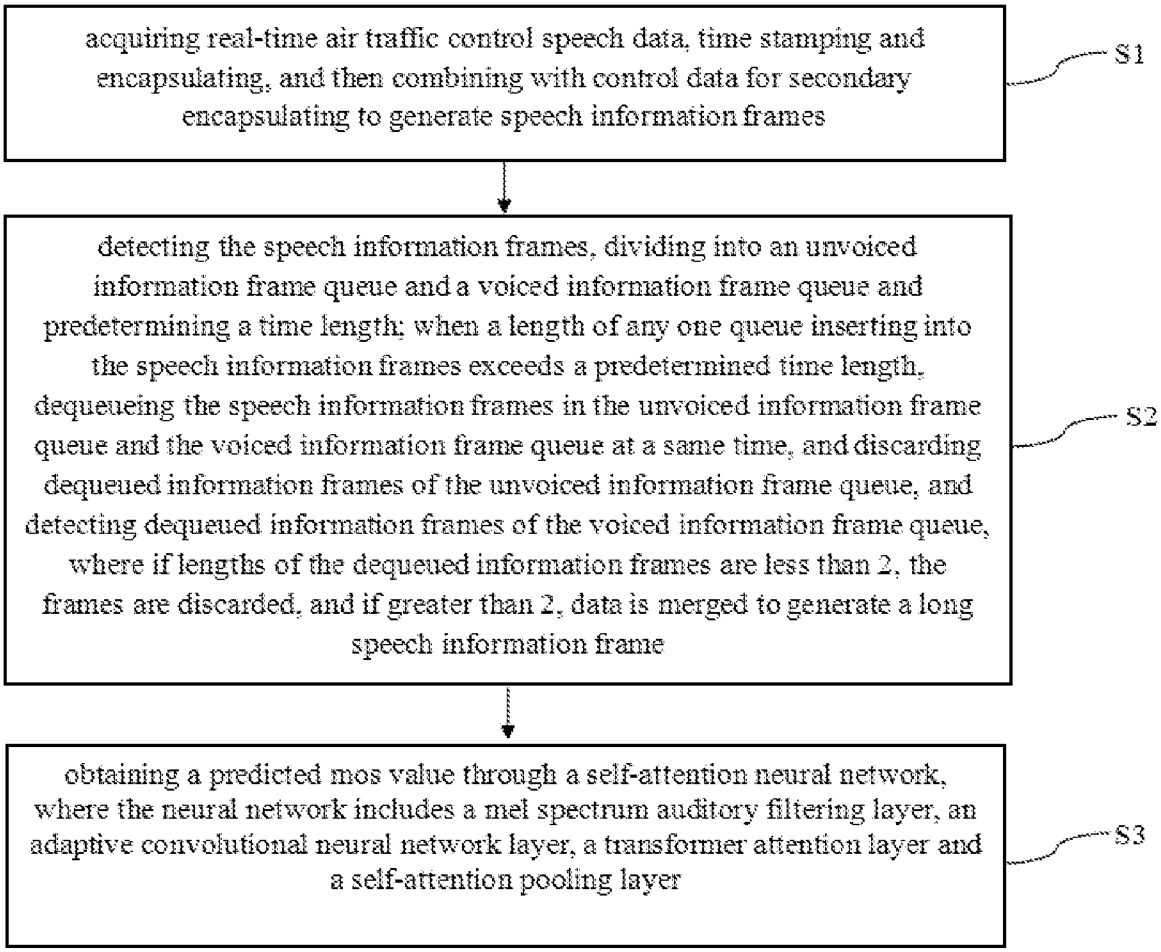
FIG. 8 is a flow chart of a self-attention-based speech quality measuring method for real-time air traffic control.

As shown in FIG. 8, self-attention-based speech quality measuring method for real-time air traffic control provided by the present application includes:

S1, acquiring real-time air traffic control speech data, time stamping and encapsulating, and then combining with control data for secondary encapsulating to generate speech information frames;

S2, detecting the speech information frames, dividing into an unvoiced information frame queue and a voiced information frame queue and predetermining a time length; when a length of any one queue inserting into the speech information frames exceeds a predetermined time length, dequeueing the speech information frames in the unvoiced information frame queue and the voiced information frame queue at a same time, and discarding dequeued information frames of the unvoiced information frame queue, and detecting dequeued information frames of the voiced information frame queue, and merging information larger than 0.2 second in dequeued information frames of the voiced information frame queue to generate a long speech information frame; and

S3, obtaining a predicted mos value through a self-attention neural network, where the neural network includes a mel spectrum auditory filtering layer, an adaptive convolutional neural network layer, a transformer attention layer and a self-attention pooling layer.

Specifically, the S3 includes:

S31, differentially enhancing the high-frequency components in the long speech information frame to obtain an information frame, segmenting and windowing the information frame, and then converting the processed information frame into a power spectrum by using Fast Fourier Transform (FFT), and dot-producting the power spectrum with mel filter banks to generate a mel spectrogram;

S32, resampling the mel spectrogram segment based on a convolutional neural network containing a convolutional layer and adaptive pooling to generate a feature vector;

S33, extracting attention from the feature vector and generating an attention vector based on the transformer attention layer and the multi-head attention model;

S34, performing feature fusion on the attention vector based on the self-attention pooling layer to obtain a predicted mos value; and

S35, linking the mos value and the corresponding long speech information frame to generate real-time measurement data.

Figure 1:
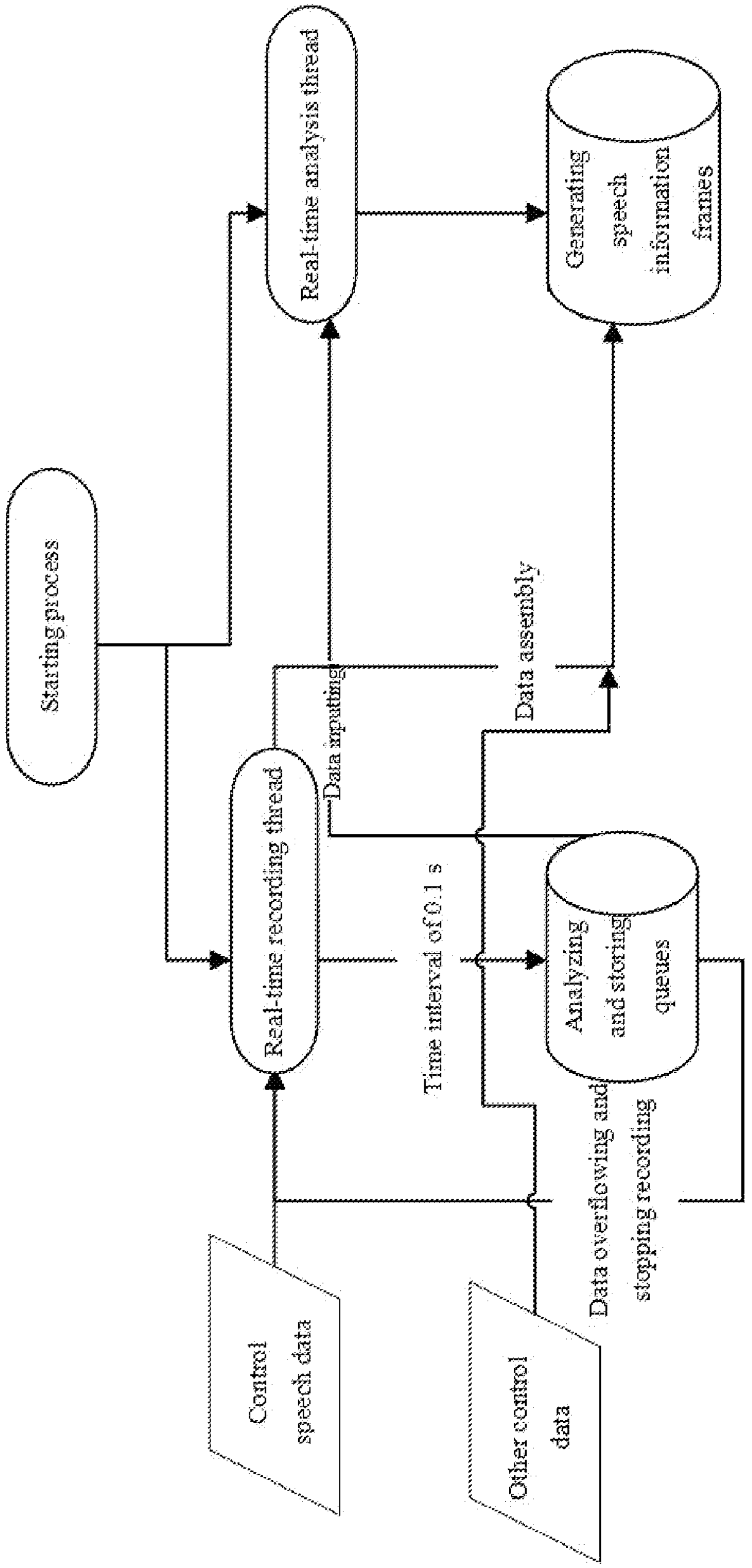
FIG. 1 is a flowchart of generating real-time speech information frame according to the present application.

Specifically, in the measuring method provided by the present application, the S1 is for processing and generating the real-time speech information frame. Referring to FIG. 1, the real-time analysis thread stores the speech data in the internal memory in the form of bit, and at the same time, the real-time recording thread starts timing, and takes the speech data out of the internal memory at a time interval of 0.1 second and stamps the speech data with a time tag for the first time of encapsulating. After the encapsulating, the speech data is encapsulated with the control data for the second time to form a speech information frame. Among them, the control data include latitude and longitude of aircraft, wind speed, and some real-time air traffic control data. The generated speech information frame is the minimum processing information unit for the subsequent steps.

Figure 2:
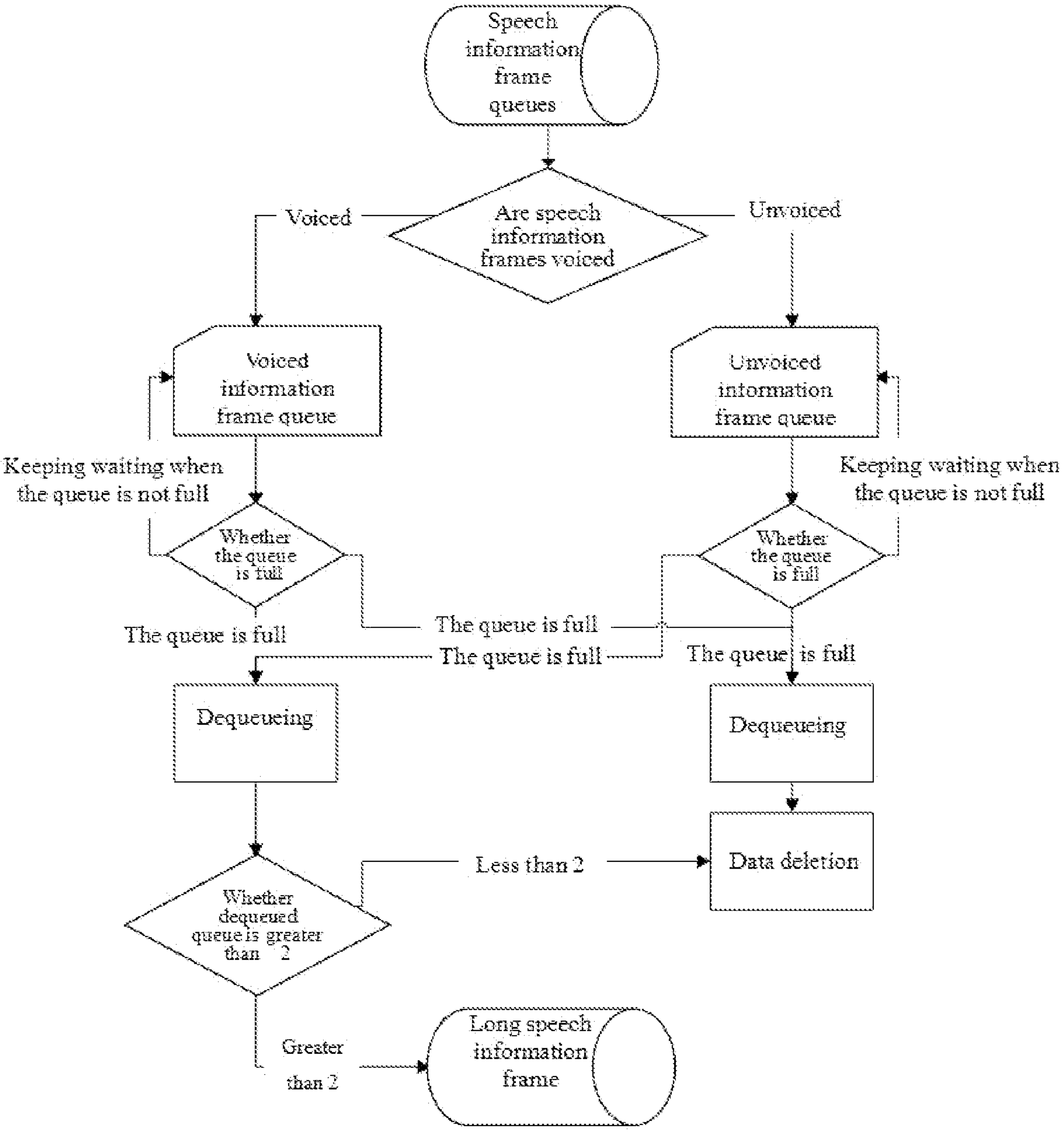
FIG. 2 is a flowchart of processing voiced and unvoiced information frame queues according to the present application.

Specifically, in the measuring method provided by the present application, the S2 is for detecting and synthesizing voice or voiceless in the speech information frame. Referring to FIG. 2, in the detected speech information frame, the detected speech information frame with voice is added to the voiced information frame queue, and the detected speech information frame without voice is added to the unvoiced information frame queue. The length of the two queues is constant at 33. In other words, the maximum number of inserted speech frames is 33, and the total speech length is 3.3 seconds. When one of the voiced information frame queue or the unvoiced information frame queue is full, the speech information frames in the two queues are dequeued at the same time, the dequeued information in the unvoiced information frame queue is discarded, and the dequeued speech information frames in the voiced information frame queue are detected.

The dequeued speech information frames are detected whether the queue length is greater than 2. In other words, the total speech time length in the dequeued speech frame queue is greater than 0.2 second, and is the shortest control speech instruction time length. If the dequeued speech information frame length is less than 2, the frame is discarded, and if the dequeued speech information frame length is greater than 2, the data is merged. Among them, the process of data merging combines the speech composed of in a form of bit into a long speech information frame and saving the long speech information frame in external memory.

In generating long speech information frame, the starting time of the speech information frame at the head of the voiced information frame queue is taken as the starting time, and the ending time of the speech information frame at the tail of the voiced information frame queue is taken as the ending time, and the control data encapsulated with the speech information frame may be merged with the long speech information frame at a self-defined time.

Figure 3:
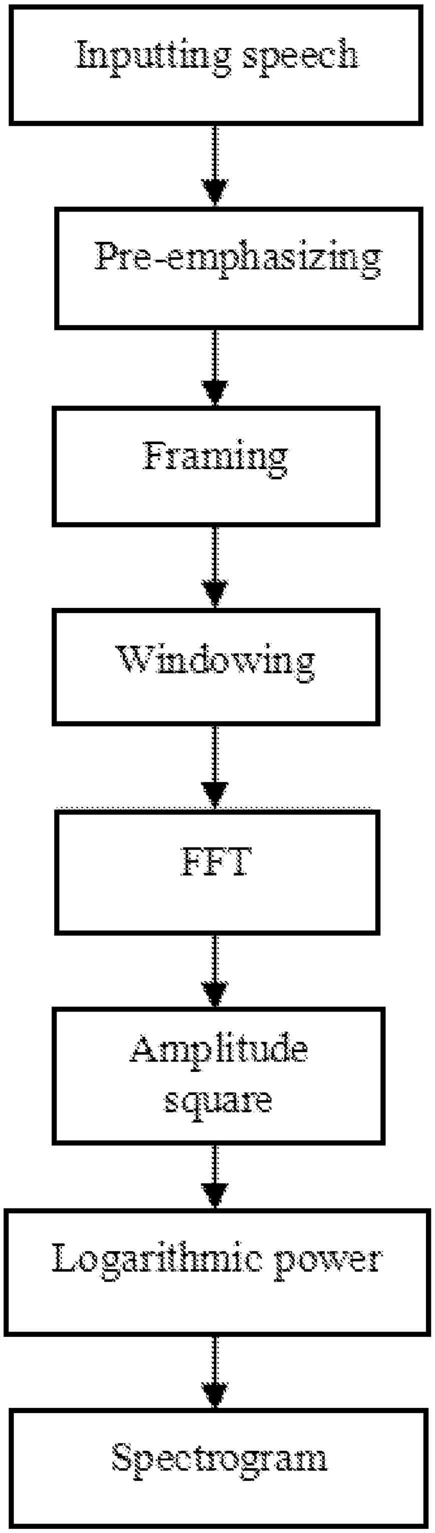
FIG. 3 is a flow chart of processing by mel spectrogram auditory filtering layer according to the present application.

Specifically, in the measuring method provided by the present application, the S31 is for emphasizing the long speech information frame, differentially enhancing the long speech information frame, converting the long speech information frame into a power spectrum, and generating a mel spectrogram, as shown in FIG. 3. Firstly, the input long speech information frame is assigned a value of X [1 . . . n], and is subjected to one time of difference in time domain. The difference formula is:

$$y[n]=x[n]-\alpha x[n-1],$$

where $\alpha$ takes 0.95, y[n] is the long speech information frame after differential enhancement, and this step segments the long speech information frame. In this embodiment, 20 milliseconds is chosen as the interval for segmentation, and in order to protect the information between two frames, 10 milliseconds is taken as the interval between two adjacent frames.

The long speech information frame after framing is windowed by Hamming window in order to obtain better sidelobe reduction amplitude, and then speech signal is converted into power spectrum by fast Fourier transform, and the fast Fourier formula is:

$$X(2l)=\sum_{n=0}^{\frac{N}{2}-1}\left[x(n)+x\left(n+\frac{N}{2}\right)\right]W_n^{2kn},\ k=0,1,\ldots,N$$

$$X(2l+1)=\sum_{n=0}^{\frac{N}{2}-1}\left[x(n)-x\left(n+\frac{N}{2}\right)\right]W_n^{2kn}\Big]W_n^{n},\ k=0,1,\ldots,\frac{N}{2}-1$$

The power spectrum is dot-product with mel filter banks to map the power spectrum to mel frequency and distribute the mel frequency linearly. In this embodiment, 48 mel filter banks are selected, and the mapping formula is as follows:

$$H_m(k)=\begin{cases}0 & k<f(m-1)\\ \dfrac{k-f(m-1)}{f(m)-f(m-1)} & f(m-1)\le k\le f(m)\\ \dfrac{f(m+1)-k}{f(m+1)-f(m)} & f(m-1)\le k\le f(m)\\ 0 & k>f(m+1)\end{cases},$$

where k represents an input frequency and is used to calculate a frequency corresponding $H_m(k)$ of each of mel filters, m represents a serial number of the filters, f(m−1) and f(m), and f(m+1) respectively correspond to a starting point, an intermediate point and an ending point of an m-th filter.

After the above steps are completed, one mel spectrogram segment with a length of 150 milliseconds and a height of 48 is generated for every 15 groups, in which 40 milliseconds is selected as the interval between segments.

Figure 4:
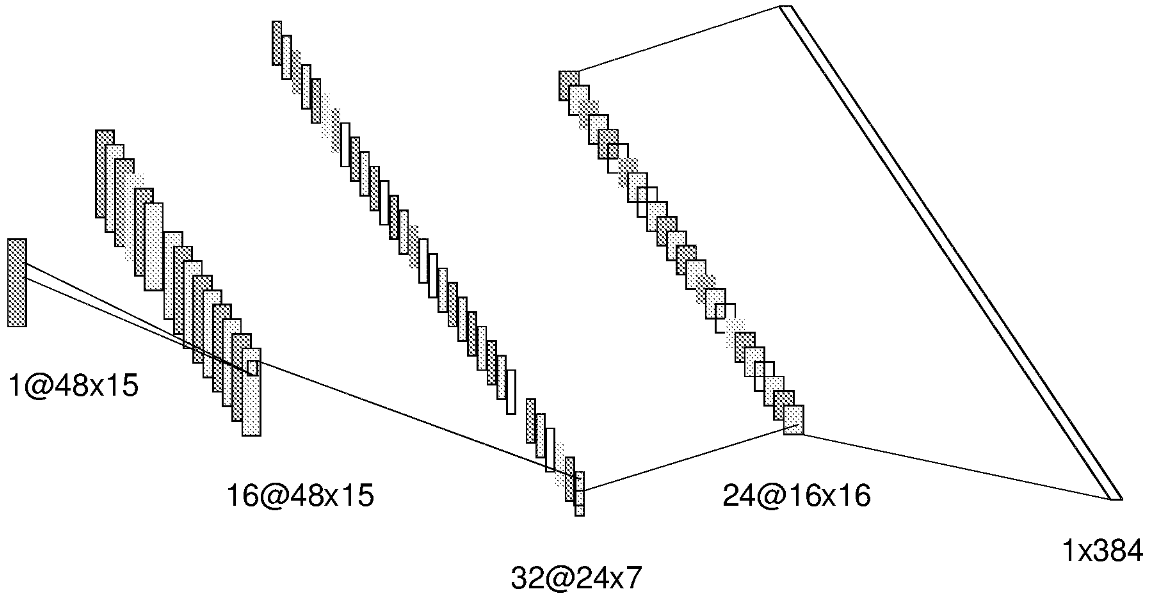
FIG. 4 is a schematic diagram of convolutional neural network processing according to the present application.

Specifically, in the measuring method provided by the present application, the S32 is for processing and normalizing the input mel spectrogram through the adaptive convolutional neural network layer. FIG. 4 is a schematic diagram of the processing of convolutional neural network. First, a picture $X_{ij}$ of 48*15 is input, and processed by a 3*3 two-dimensional convolutional neural network. The formula is as follows:

$$Y_{conv}=W*X_{ij}+b,$$

where $X_{ij}$ is the input picture with i*j pixel, $Y_{conv}$ is the vector after convolution, W is the convolution kernel value and b is an offset value.

The convolved vector is normalized by two-dimensional batch. Firstly, the sample mean and variance of the vector are calculated, and the formula is as follows:

$$\mu_\beta = \frac{1}{m}\sum_{i=1}^{m} x_i$$

$$\sigma_\beta^2 = \frac{1}{m}\sum_{i=1}^{m}(x_i - \mu_\beta)^2$$

After obtaining $\mu_\beta$ and $\sigma_\beta^2$, normalization calculation is carried out by following formula:

$$\hat{x}_i = \frac{x_i - \mu_\beta}{\sqrt{\sigma_\beta^2 - \epsilon}},$$

where $\in$ is a smaller value added to the variance to prevent division by zero, $X_i$ is the vector after convolution.

The two-dimensional batch normalization formula is as follows:

$$Y_{batchNorm2D}=\gamma\hat{x}_i+\beta,$$

where $\gamma$ is a trainable proportional parameter, $\beta$ is a trainable deviation parameter and $Y_{batchNorm2D}$ is a two-dimensional batch normalized value.

The two-dimensional batch normalized value is activated by using an activation function, where the activation function is as follows:

$$Y_{relu}=\max(0,(W*X_{ij}+b)),$$

where W is the convolution kernel value and b is the vector of the offset value after convolution. In order to ensure a reasonable gradient when training the network, the adaptive maximum two-dimensional pool is selected for pooling, which is the core of the adaptive convolutional neural network.

The vector $Y_{relu}$ obtained above is recorded as $X_{W*H}$, with the height of H and the width of Wand then following formulae are used for calculation:

$$hstart = \mathrm{floor}\left(i * \frac{H_{in}}{H_{out}}\right),$$

$$hend = \mathrm{ceil}\left((i+1) * \frac{H_{in}}{H_{out}}\right),$$

$$wstart = \mathrm{floor}\left(j * \frac{W_{in}}{W_{out}}\right),$$

$$wend = \mathrm{ceil}\left((j+1) * \frac{W_{in}}{W_{out}}\right),$$

$$Y_{AdaptiveMaxPool2D}=\max(\mathrm{input}[hstart: hend, wstart: wend]),$$

where floor is a downward integer function and ceil is an upward integer function.

Figure 5:
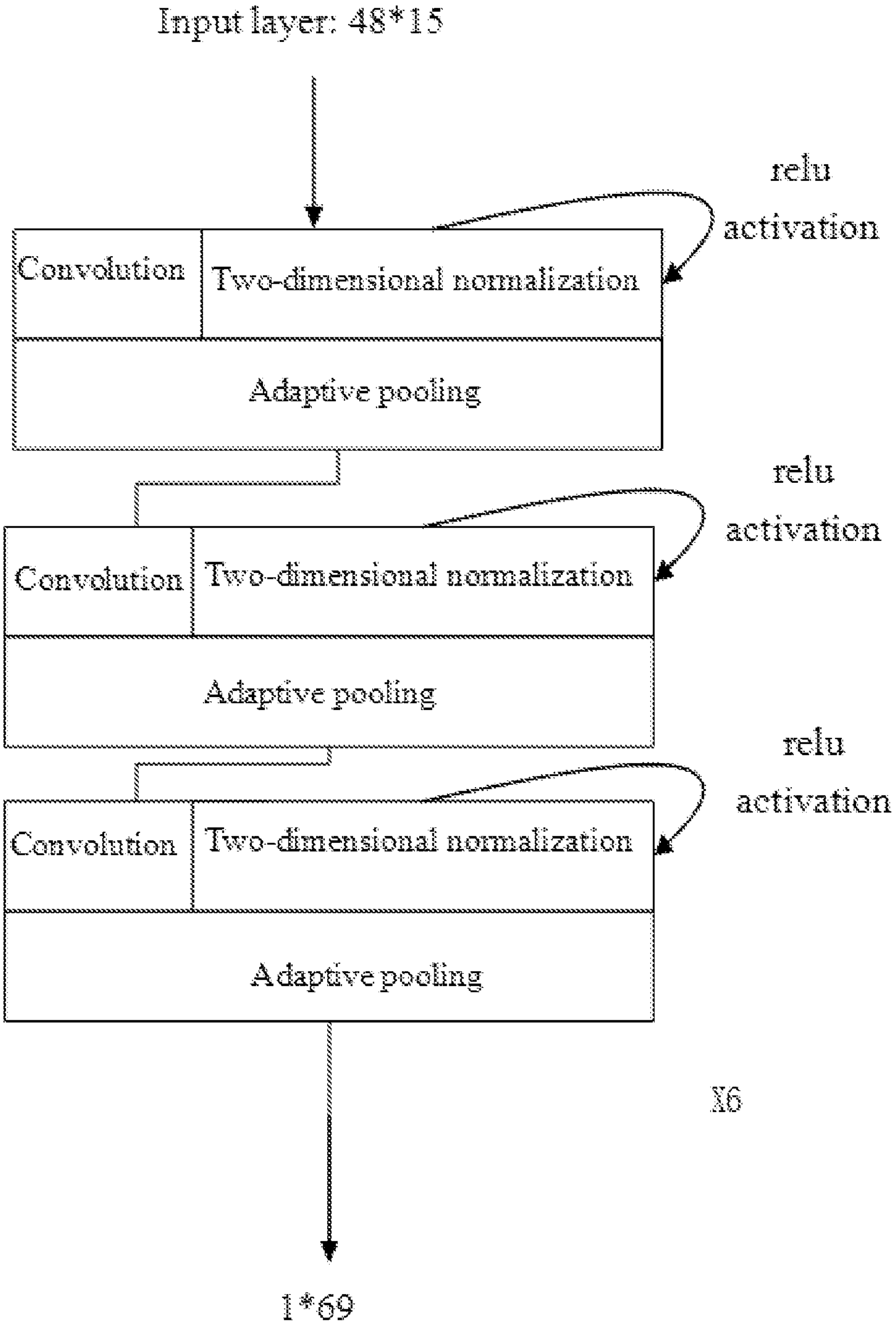
FIG. 5 is a flowchart of resampling mel spectrogram according to the present application.

The above steps are carried out six times. Referring to FIG. 5, the input mel spectrogram segment of 48*15 is resampled to the size of 6*3. Then the data convolved by 64 convolution kernels in the convolutional layer are merged into a tensor of 64*6*1, and finally normalized into a feature vector $X_{cnn}$ with a length of 384, where $X_{cnn}=[X_1, X_2 \ldots X_n]_{1*384}$.

Figure 6:
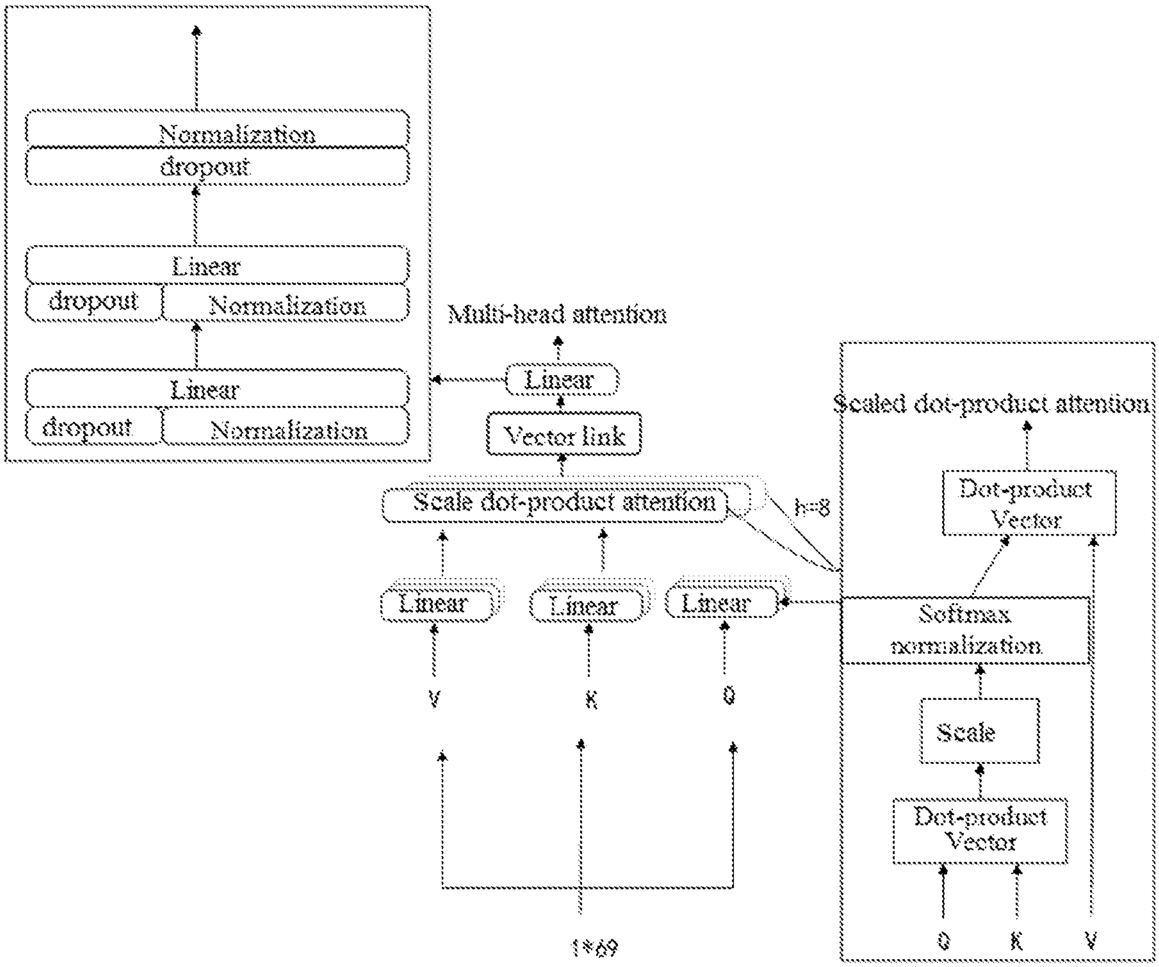
FIG. 6 is a flowchart of processing by a transformer attention layer and an attention model according to the present application.

Specifically, in the measuring method provided by the present application, the S33 is for extracting features related to speech quality by using multi-head attention in the transformer model, and the flowchart of this step is as shown in FIG. 6. Each head in the multi-head attention model carries out embedding with the corresponding vector to obtain the time sequence information. The vector that has completed the time sequence processing is first transformed by three learning matrices $W_Q$, $W_k$, $W_v$, and the transformation formulae are:

$$Q=XW_Q,$$

$$K=XW_K, \text{ and}$$

$$V=XW_V.$$

The attention weight of the transformed matrices is calculated, and the formula is:

$$W_{attention} = \left(\frac{\frac{Q*K^T}{e\sqrt{d}}}{\sum_{i=o}^{n} e^{\frac{Q*K^T}{\sqrt{d}}}}\right)V,$$

where $K^T$ is the transpose of K matrix and $\sqrt{d}$ is the length of $X_{cnn}$.

The weight is dot-product with the vector to get the attention vector extracted for each head in the multi-head attention model. The calculation formula is as follows:

$$X_{attention}=W_{attention}*X_{cnn},$$

where $X_{cnn}$ is the feature vector.

The embodiment provided by the application selects an 8-head attention model, so that the result vector generated by attention is:

$$Y_{attention}'=\mathrm{concat}[X_{attention}^1, X_{attention}^2 \ldots X_{attention}^8]_{1*8}*W_O,$$

where concat is a vector connection operation and $W_o$ is a learnable multi-head attention weight matrix.

The generated multi-head attention passes through two fully connected layers, and the dropout of 0.1 is used between the fully connected layers, and the output of fully connected layers is normalized by the layernorm, and the formula is as follows:

$$\mu = \frac{1}{H}\sum_{i=1}^{H} x_i$$

$$\sigma = \sqrt{\frac{1}{H}\sum_{i}^{H}(x_i - \mu)^2 + \varepsilon}$$

$$Y_{layernorm} = f\left(\frac{g}{\sigma}(x - \mu) + b\right)$$

The normalized vector $Y_{layernorm}$ obtained is activated by gelu, and the calculation formula is as follows:

$$Y_{attention} = 0.5 * Y_{layernorm} * \left(1 + \tanh\left(\sqrt{\frac{2}{\pi}} * \left(Y_{layernorm} + 0.044715 Y_{layernorm}^3\right)\right)\right),$$

where $Y_{attention}$ is the final attention vector.

Figure 7:
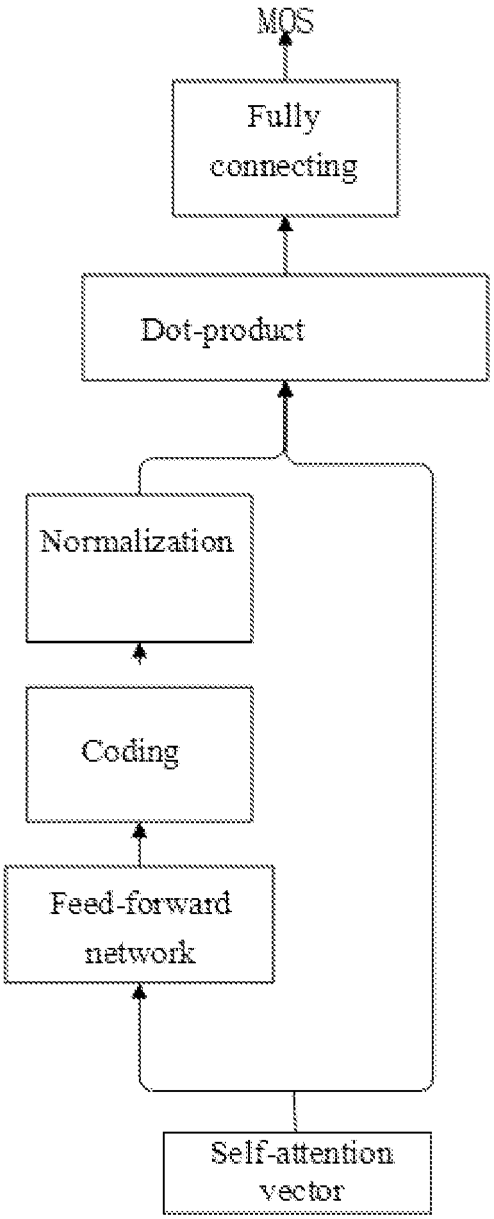
FIG. 7 is a flow chart of processing by a self-attention pooling layer according to the present application.

Specifically, in the measuring method provided by the present application, the S34 is for using self-attention pooling to carry out feature fusion and completing the evaluation of the quality of control speech. The processing flow chart of self-attention pooling is shown in FIG. 7.

The vector $X_{attention}=[X_{ij}]_{69*64}$ with attention generated in the S33 enters a layer of feed-forward network, where the feed-forward network includes two fully connected layers, and fully connected layers are activated by relu activation function, and then passes through one fully connected layer after a dropout of 0.1, and the formula is as follows:

$$X_{feedforward}=\text{linear}_2(\text{relu}(\text{linear}_1(X_{attention}))),$$

$$X_{feedforward}=A_2(\text{relu}(A_1(X_{attention})+b_1))+b_2,$$

After the above steps are completed, the vector $X_{attention}$ is compressed to a length of 1*69, and the parts beyond this length is coded and masked, and the formula is as follows:

$$X_{mask}i = \begin{cases} X_{feedforward}i, & i \le 69 \\ 0, & i > 69 \end{cases}.$$

The coded vector is normalized by softmax function, and the formula is as follows:

$$X_{softmax} = \frac{e^{X_{mask}}}{\sum_{i=1}^{69} e^{X_{mask}}}.$$

In order to avoid the problem of attention fraction dissipation caused by feed-forward network processing, the final attention vector $Y_{attention}$ is dot-product with the vector $X_{softmax}$ by using dot product method of vector itself, and the formula is as follows:

$$X_{dotplus}=Y_{attention}\cdot X_{softmax}.$$

Finally, the obtained vector $X_{dotplus}$ passes through the last fully connected layer, and the obtained vector is the predicted mos value of the current speech segment.

Specifically, in the measuring method provided by the application, the S35 links the mos value and the corresponding long speech information frame to generate real-time measurement data. For each acquired real-time speech, a series of mos score values may be obtained through the above steps, and each value corresponds to the speech quality in a time period.

The above is only the preferred embodiment of the application, and it is not used to limit the application. Any modification, equivalent substitution and improvement made within the spirit and principle of the application should be included in the protection scope of the application.

What is claimed is:

1. A self-attention-based speech quality measuring method for real-time control, comprising:

S1, acquiring real-time air traffic control speech data, time stamping and encapsulating, and then combining with control data for secondary encapsulating to generate speech information frames;

S2, detecting the speech information frames, dividing into an unvoiced information frame queue and a voiced information frame queue and predetermining a time length;

when a length of any one queue inserting into the speech information frames exceeds a predetermined time length of 33 frames, wherein the duration of each frame is 0.1 second, dequeueing the speech information frames in the unvoiced information frame queue and the voiced information frame queue at a same time, wherein the voiced information frame queue includes frames including voice activity and the unvoiced information frame queue includes frame without voice activity, and discarding dequeued information frames of the unvoiced information frame queue, and detecting dequeued information frames of the voiced information frame queue, wherein in one subset of the dequeued information frames length of the dequeued information frames is less than 2 frames and the frames are discarded, and wherein in another subset of the dequeued information frames, the length of the dequeued information frames is greater than or equal to 2 frames and data is merged to generate a long speech information frame; and

S3, processing the long speech information frame through a self-attention neural network and obtaining a predicted Mean Opinion Score (mos) value, wherein the neural network comprises a mel spectrum auditory filtering layer, an adaptive convolutional neural network layer, a transformer attention layer and a self-attention pooling layer.

2. The self-attention-based speech quality measuring method for real-time control according to claim 1, wherein in the S2, the long speech information frame is generated, with a start time of a speech information frame at a head of the voiced information frame queue as a start time and an end time of a speech information frame at a tail of the voiced information frame queue as an end time, the control data is mergeable with the long speech information frame at a self-defined time.

3. The self-attention-based speech quality measuring method for real-time control according to claim 1, wherein the mel spectrum auditory filtering layer converts the long speech information frame into a power spectrum, followed by dot-producting with mel filter banks to map a power into a mel frequency and linearly distribute, wherein a following formula is used to map:

$$H_m(k)=\begin{cases}0 & k<f(m-1)\\ \dfrac{k-f(m-1)}{f(m)-f(m-1)} & f(m-1)\le k\le f(m)\\ \dfrac{f(m+1)-k}{f(m+1)-f(m)} & f(m-1)\le k\le f(m)\\ 0 & k>f(m+1)\end{cases},$$

wherein k represents an input frequency and is used to calculate a frequency corresponding $H_m(k)$ of each of mel filters, m represents a serial number of the filters, f(m−1) and f(m), and f(m+1) respectively correspond to a starting point, an intermediate point and an ending point of an m-th filter, and a mel spectrogram is generated after dot product.

4. The self-attention-based speech quality measuring method for real-time control according to claim 3, wherein converting the long speech information frame into the power spectrum comprises differentially enhancing high-frequency components in the long speech information frame to obtain an information frame, segmenting and windowing the information frame, and then converting a processed information frame into the power spectrum by using Fourier transform.

5. The self-attention-based speech quality measuring method for real-time control according to claim 1, wherein the adaptive convolutional neural network layer comprises a convolutional layer and an adaptive pool, resamples a mel spectrogram, then merges data convolved by convolution kernels in the convolutional layer into a tensor, followed by normalizing into a feature vector.

6. The self-attention-based speech quality measuring method for real-time control according to claim 1, wherein the transformer attention layer applies a multi-head attention model to carry out embedding a feature vector for time sequence processing, and applies learning matrices to convert a processed vector, and applies a calculation formula to calculate an attention weight of a converted vector, wherein the calculation formula is as follows:

$$W_{attention}=\left(\frac{\dfrac{Q*K^T}{e\sqrt{d}}}{\sum_{i=o}^{n} e^{\frac{Q*K^T}{\sqrt{d}}}}\right)V,$$

wherein $K^T$ is a transpose of a K matrix, $\sqrt{d}$ is a length of the feature vector and $W_{attention}$ is a weight, and an attention vector $X_{attention}$ is obtained by dot-producting the weight with the feature vector.

7. The self-attention-based speech quality measuring method for real-time control according to claim 6, wherein after an extraction of the attention vector is completed, a multi-head attention vector $X_{attention}'$ is calculated by using a multi-head attention model, normalized by layernorm to obtain $Y_{layernorm}$ and then activated by gelu to obtain a final attention vector $Y_{attention}$, wherein a calculation formula is as follows:

$$Y_{attention}'=\text{concat}[X_{attention}^{1}, X_{attention}^{2}\ldots X_{attention}^{n}]_{1*n}*W_0,$$

wherein concat is a vector connection operation and $W_o$ is a learnable multi-head attention weight matrix;

a gelu activation formula is as follows:

$$Y_{attention}=0.5*Y_{layernorm}*\left(1+\tanh\left(\sqrt{\frac{2}{\pi}}*\left(Y_{layernorm}+0.044715Y_{layernorm}^{3}\right)\right)\right),$$

8. The self-attention-based speech quality measuring method for real-time control according to claim 1, wherein the self-attention pooling layer compresses a length of the attention vector through a feed-forward network, codes and masks a vector part beyond the length, normalizes a coded masked vector, dot-products the coded masked vector with a final attention vector, and a dot-product vector passes through a fully connected layer to obtain a predicted mos value vector.

9. The self-attention-based speech quality measuring method for real-time control according to claim 1, wherein the mos value is linked with a corresponding long speech information frame to generate real-time measurement data.

10. The method of claim 1, wherein the neural network is trained using air traffic control speech data of the duration and characteristics used in S2.

11. A self-attention-based speech quality measuring system for real-time control, comprising a processor, a network interface and a memory, wherein the processor, the network interface and the memory are connected with each other, the memory is used for storing a computer program, the computer program comprises program instructions, the processor is configured to call the program instructions to execute the self-attention-based speech quality measuring method for real-time control according to claim 1.

12. The system of claim 11, wherein the neural network is trained using air traffic control speech data of the duration and characteristics used in S2.

* * * * *